United States Patent
Wang et al.

(10) Patent No.: US 12,228,237 B2
(45) Date of Patent: Feb. 18, 2025

(54) LIFTING DEVICE

(71) Applicant: Neatframe Limited, London (GB)

(72) Inventors: Hung-Tse Wang, New Taipei (TW); Jun-Hong Lin, New Taipei (TW)

(73) Assignee: Neatframe Limited, London (GB)

( * ) Notice: Subject to any disclaimer, the term of this patent is extended or adjusted under 35 U.S.C. 154(b) by 0 days.

(21) Appl. No.: 18/482,026

(22) Filed: Oct. 6, 2023

(65) Prior Publication Data

US 2024/0117917 A1 Apr. 11, 2024

Related U.S. Application Data

(60) Provisional application No. 63/414,909, filed on Oct. 11, 2022.

(51) Int. Cl.
*F16M 11/04* (2006.01)
*F16M 13/02* (2006.01)

(52) U.S. Cl.
CPC .......... *F16M 11/046* (2013.01); *F16M 13/02* (2013.01)

(58) Field of Classification Search
CPC ............... F16M 11/046; F16M 13/02; F16M 2200/047; A47B 97/001; G06F 1/1601; G06F 1/1632; G06F 2200/1012
USPC .......... 248/157, 297.11; 361/679.01
See application file for complete search history.

(56) References Cited

U.S. PATENT DOCUMENTS

| | | | |
|---|---|---|---|
| 6,712,321 B1 * | 3/2004 | Su ................. | F16M 11/2064 248/917 |
| 7,628,371 B2 * | 12/2009 | Gan .................. | F16M 11/2021 248/162.1 |
| 7,784,747 B2 * | 8/2010 | Gan ..................... | F16M 11/24 248/917 |
| 10,161,558 B2 * | 12/2018 | Lee ...................... | F16M 11/046 |
| 11,334,111 B2 * | 5/2022 | Kang .................... | H10K 59/00 |

(Continued)

FOREIGN PATENT DOCUMENTS

| | | |
|---|---|---|
| CN | 103185190 | 7/2013 |
| WO | 2019241064 | 12/2019 |

OTHER PUBLICATIONS

"Office Action of Taiwan Counterpart Application", issued on Jun. 18, 2024, p. 1-p. 12.

(Continued)

*Primary Examiner* — Anita M King
(74) *Attorney, Agent, or Firm* — Wolf, Greenfield & Sacks, P.C.

(57) ABSTRACT

A lifting device is provided. The lifting device includes a stationary member, a lifting member, positioning bases, reels, and springs. The lifting member is slidably coupled to the stationary member. The lifting member is fixed to a back portion of the display. The positioning bases are disposed on the stationary member and the lifting member. The reels are pivoted on the positioning bases. The springs are wound around the reels and connected to the other of the stationary member and the lifting member relative to the positioning bases. When the display or the lifting member is subjected to an applied force toward a sliding direction, the lifting member slides toward the sliding direction relative to the stationary member. The springs stretched by the lifting member generate an elastic force, so that the lifting member and the display no longer subjected to a force stay at a height position after sliding.

15 Claims, 5 Drawing Sheets

(56) References Cited

U.S. PATENT DOCUMENTS

2008/0237411 A1    10/2008   Kim et al.
2010/0213151 A1     8/2010   Theesfeld et al.
2015/0330557 A1    11/2015   Aoyagi et al.
2021/0034098 A1     2/2021   Kang et al.

OTHER PUBLICATIONS

"Search Report of Europe Counterpart Application", issued on Mar. 11, 2024, p. 1-p. 9.

* cited by examiner

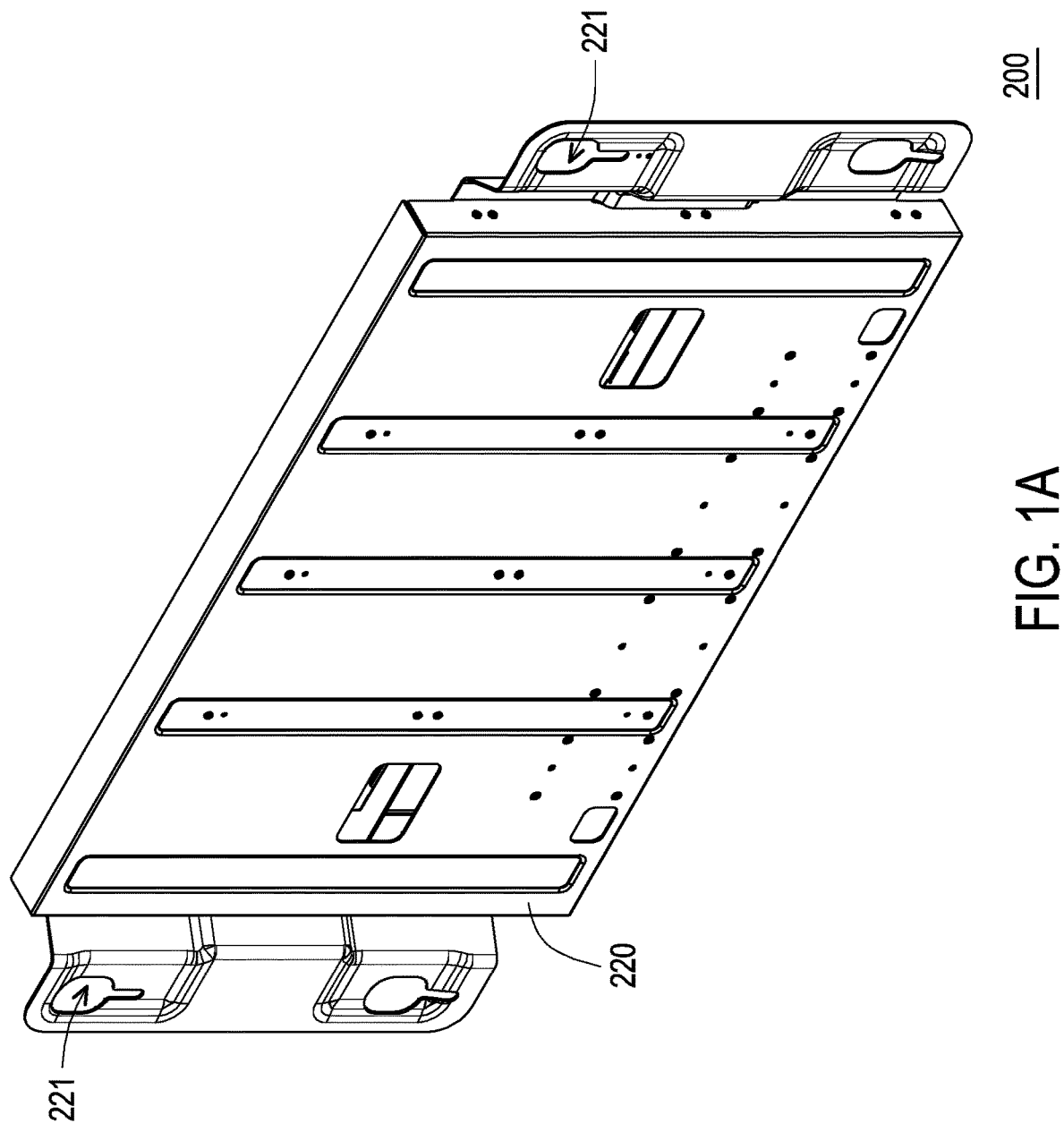

LIFTING DEVICE

CROSS REFERENCE TO RELATED APPLICATION

This application claims the priority benefit of U.S. provisional application Ser. No. 63/414,909, filed on Oct. 11, 2022. The entirety of the above-mentioned patent application is hereby incorporated by reference herein and made a part of this specification.

TECHNICAL FIELD

The disclosure relates to a lifting device, and in particular to a lifting device of a display.

DESCRIPTION OF RELATED ART

Large-size displays are often found in large venues or public spaces and are mostly fixed to walls or stands through mounting mechanisms. In detail, the height from the ground of most of the conventional mounting mechanisms of the large-size displays may not be adjusted after being fixed. Usually, only the angle of inclination of the display may be adjusted. Since the weight of the large-size display is tens of kilograms or more, it is very inconvenient if the user needs to dismantle the mounting mechanism and reassemble to adjust the height. The traditional height adjustment mechanism of the display is designed on the stand of the display. The effortless height adjustment design needs to internally integrate an electric lifting motor and a control circuit. The user operates a built-in control interface or a remote control device to output a control signal, so as to activate the electric lifting motor to provide the power needed for lifting the display. Such effortless stand not only requires electric power, but also causes the large-size display unable to be directly mounted on the wall for use, which not only occupies additional configuration space, but also increases manufacture and construction costs.

Moreover, although a manual display height adjustment mechanism is proposed, the user needs to expend greater force to push or pull the display, resulting in significant hand obstruction during operation.

SUMMARY

The disclosure provides a lifting device that helps the user manually adjust the height position of a display with less effort and reduces the weight in the hand.

An embodiment of the disclosure provides a lifting device suitable for adjusting a height of a display. The lifting device includes a stationary member, a lifting member, a plurality of positioning bases, a plurality of reels, and a plurality of springs. The lifting member is slidably coupled to the stationary member. The lifting member is suitable for being fixed to a back portion of the display. The plurality of positioning bases are disposed on one of the stationary member and the lifting member and located between the lifting member and the stationary member. The plurality of reels are respectively pivoted on the plurality of positioning bases. The plurality of springs are respectively wound around the plurality of reels and connected to the other of the stationary member and the lifting member relative to the plurality of positioning bases. When the display or the lifting member is subjected to an applied force toward a sliding direction, the lifting member slides toward the sliding direction relative to the stationary member. The plurality of springs stretched by the lifting member generate an elastic force, so that the lifting member and the display no longer subjected to a force stay at a height position after sliding.

In an embodiment of the disclosure, the plurality of springs include a plurality of constant force springs.

In an embodiment of the disclosure, each of the positioning bases has a positioning groove for accommodating the corresponding reel and the spring wound thereon. A gap is kept between each of the springs and a bottom surface of the positioning groove where the spring is located.

In an embodiment of the disclosure, each of the positioning bases has a first pivot portion, and each of the reels has an axis center and a second pivot portion where the axis center is located. The second pivot portion of each of the reels is rotatably coupled to the first pivot portion.

In an embodiment of the disclosure, each of the first pivot portions and the corresponding second pivot portion are a combination of a pivot groove and a convex shaft rotatably inserted in the pivot groove. Each of the springs has a movable end connected to the lifting member, and there is a first force arm between the movable end of each of the springs and the axis center of the corresponding reel. An outer peripheral surface of each of the convex shafts is suitable for contacting an inner wall surface of the corresponding pivot groove, wherein a radius of each of the convex shafts forms a second force arm, and the second force arm is less than the first force arm.

In an embodiment of the disclosure, each of the first pivot portions and the corresponding second pivot portion are a combination of a pivot groove and a convex shaft rotatably inserted in the pivot groove. Each of the springs has a movable end connected to the lifting member, and there is a horizontal distance between the movable end of each of the springs and the axis center of the corresponding reel. An outer peripheral surface of each of the convex shafts is suitable for contacting an inner wall surface of the corresponding pivot groove, wherein there is a vertical distance between the axis center of each of the reels and the inner wall surface of the corresponding pivot groove, and the vertical distance is less than the horizontal distance.

In an embodiment of the disclosure, the lifting device further includes at least one sliding rail and at least one sliding seat. The sliding rail is fixed to the lifting member, wherein an extending direction of the sliding rail is parallel to the sliding direction. The stationary member is connected to the sliding seat, and the sliding seat is slidably coupled to the sliding rail.

Another embodiment of the disclosure provides a lifting device suitable for adjusting a height of a display. The lifting device includes a stationary member, a lifting member, a linear sliding module, a plurality of positioning bases, a plurality of reels, and a plurality of springs. The lifting member is suitable for being fixed to a back portion of the display. The linear sliding module is coupled between the stationary member and the lifting member. The lifting member is slidably coupled to the stationary member through the linear sliding module to vertically slide relative to the stationary member between a first position and a second position lower than the first position. The plurality of positioning bases are disposed on one of the stationary member and the lifting member and located between the lifting member and the stationary member. The plurality of reels are respectively pivoted on the plurality of positioning bases. The plurality of springs are respectively wound around the plurality of reels and connected to the other of the stationary member and the lifting member relative to the plurality of positioning bases. When the display or the lifting member is subjected to an applied force toward the sliding direction, an axis center of each of the reels bears a resistance opposite to the applied force, the lifting portion slides away from the third position through the linear sliding module, and the plurality of springs exert a pulling force on the lifting member moving away from the third position, so that the lifting member and the display stay at a fourth position after sliding after no longer subjected to a force, and the third position and the fourth position are between the first position and the second position.

In an embodiment of the disclosure, the linear sliding module includes at least one sliding rail and at least one sliding seat, and an extending direction of the sliding rail is parallel to the sliding direction. The sliding rail is fixed to the lifting member, wherein the stationary member is connected to the sliding seat, and the sliding seat is slidably coupled to the sliding rail.

Another embodiment of the disclosure provides a lifting device suitable for adjusting a height of a display. The lifting device includes a stationary member, a lifting member, a plurality of positioning bases, a plurality of reels, and a plurality of springs. The lifting member is slidably coupled to the stationary member. The lifting member is suitable for being fixed to a back portion of the display. The plurality of positioning bases are disposed on one of the stationary member and the lifting member and located between the lifting member and the stationary member. Each of the reels has a pivot portion, and each of the reels is pivoted on the corresponding positioning base through a respective pivot portion thereof. The plurality of springs are respectively wound around the plurality of reels and connected to the other of the stationary member and the lifting member relative to the plurality of positioning bases. When the display or the lifting member receives an applied force toward the sliding direction, the plurality of springs are stretched, and the plurality of springs respectively drive the plurality of reels to rotate relative to the plurality of positioning bases, wherein the pivot portion of each of the reels bears a resistance opposite to the applied force, and a rotation resistance of each of the reels acts on the pivot portion.

Based on the above, the user only needs to manually push up or pull down the lifting member or the display to quickly adjust the height position of the display. Moreover, there are springs between the lifting member and the stationary member, wherein the springs continue to provide an upward pulling force during the lifting and lowering of the lifting member relative to the stationary member, and form a pulling force exerted on the lifting member to fix the height position of the display and prevent the lifting member and the display from falling accidentally. In addition, the pulling force exerted by the springs on the lifting member may assist the user to push up the lifting member or the display with less effort.

Furthermore, the positioning bases are fixed on the stationary member, and the reels are pivoted on the positioning bases. In addition, the springs are connected to the lifting member and wound around the reels. By reducing the friction torque between the reels and the positioning bases, when the user pulls down the lifting member or display, the springs may smoothly drive the reels to rotate relative to the positioning bases, thus not only helping to reduce the weight in the hand, but also helping to alleviate hand obstruction during operation.

In order to make the aforementioned features and advantages of the disclosure more comprehensible, embodiments accompanied with figures are described in detail below.

BRIEF DESCRIPTION OF THE DRAWINGS

FIG. 1A is a schematic diagram of a lifting device of an embodiment of the invention.

DESCRIPTION OF THE EMBODIMENTS

Figure 1B:
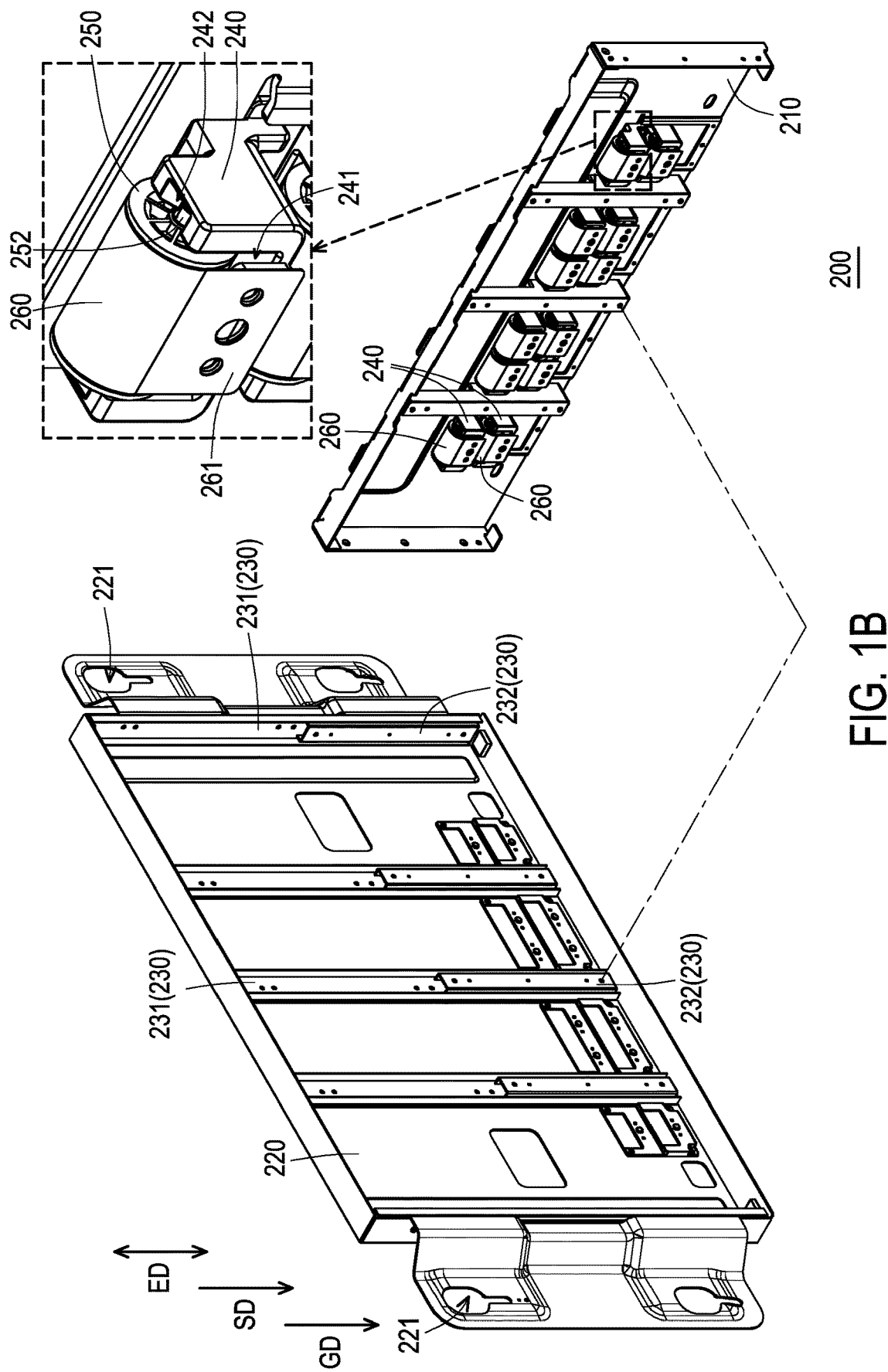
FIG. 1B is a schematic exploded view of the lifting device of FIG. 1A.

FIG. 1A is a schematic diagram of a lifting device of an embodiment of the invention. FIG. 1B is a schematic exploded view of the lifting device of FIG. 1A. Please refer to FIG. 1A and FIG. 1B. In the present embodiment, a lifting device 200 is suitable for hanging a display (not shown in the figures) so that the user may manually adjust the height position of the display (not shown in the figures). In detail, the lifting device 200 includes a stationary member 210 and a lifting member 220 slidably coupled to the stationary member 210, wherein the stationary member 210 may be fixed on a vertical plane (such as a wall perpendicular to the ground or a surface perpendicular to the ground in a carrier), and the lifting member 220 is suitable for being fixed to the back portion of the display (not shown in the figures). In other words, the back portion of the display (not shown in the figures) is suitable for being hung on the lifting member 220.

In an example, the lifting member 220 may be provided with a hook hole 221. Correspondingly, the back portion of the display (not shown in the figures) may be provided with a hook. By snapping the hook into the hook hole 221, the display (not shown in the figures) may be hung on the lifting member 220, so that the lifting member 220 and the display (not shown in the figures) are fixed to each other. In other examples, the display (not shown in the figures) and the lifting member 220 may be fixed to each other through locking, magnetic attraction, clamping, or other suitable mounting methods.

Figure 1C:
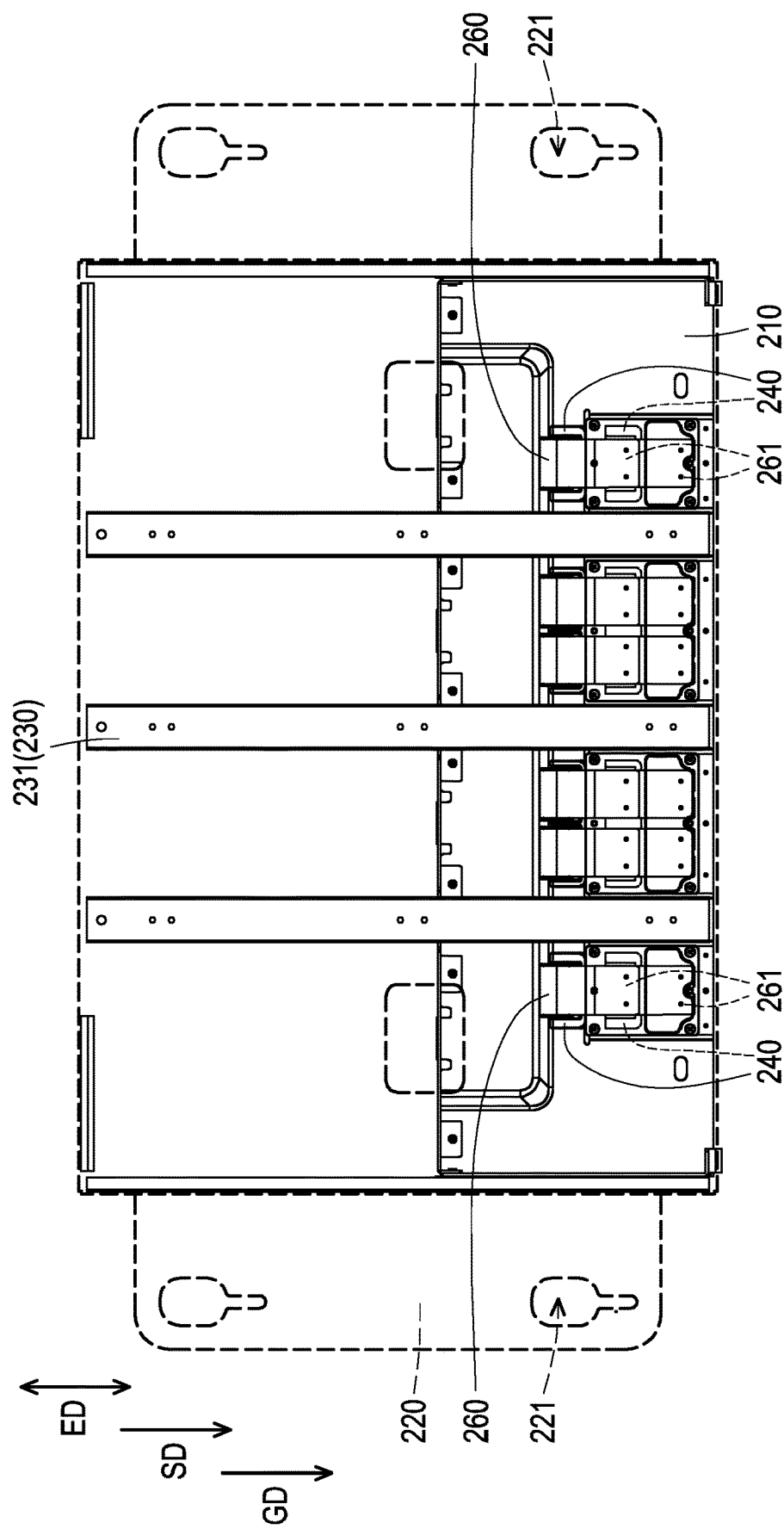
FIG. 1C is a schematic front view of the lifting device of FIG. 1A.
Figure 1D:
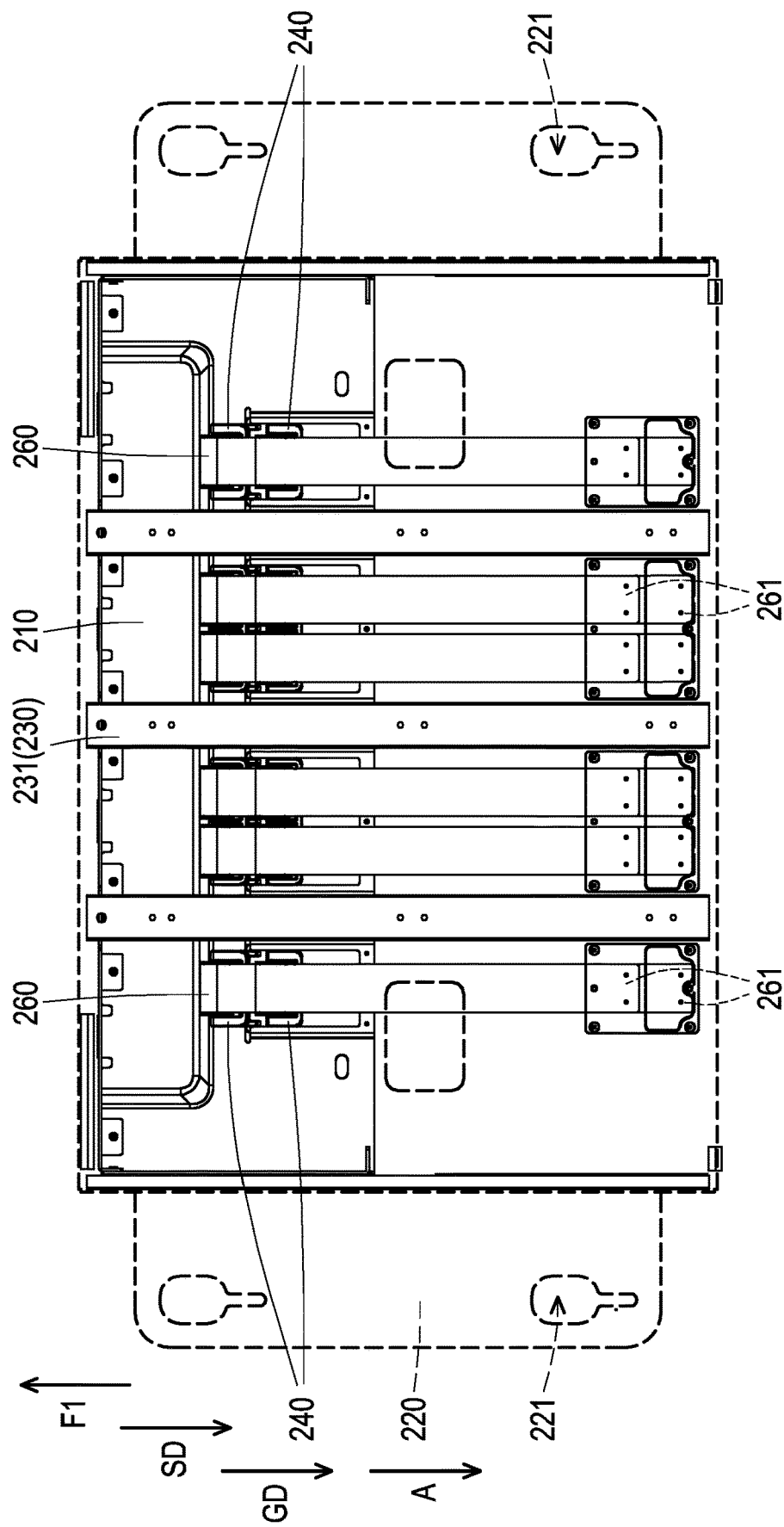
FIG. 1D is a schematic front view of the lifting device of FIG. 1C transitioning to another state.

FIG. 1C is a schematic front view of the lifting device of FIG. 1A. FIG. 1D is a schematic front view of the lifting device of FIG. 1C transitioning to another state. In order to clearly present the internal structural configuration, the lifting member 220 of FIG. 1C and FIG. 1D is shown with a dotted line. Please refer to FIG. 1B to FIG. 1D. In the present embodiment, the lifting device 200 further includes a linear sliding module 230, wherein the linear sliding module 230 is coupled between the stationary member 210 and the lifting member 220, and the lifting member 220 is slidably coupled to the stationary member 210 through the linear sliding module 230. For example, the lifting member 220 may slide vertically relative to the fixing member 210 between the first position shown in FIG. 1C and the second position shown in FIG. 1D through the linear sliding module 230 to adjust the height positions of the lifting member 220 and the display (not shown in the figures). The first position shown in FIG. 1C may be a highest height position or a relatively high height position, and the second position shown in FIG. 1D may be a lowest height position lower than the first position or a relatively low height position.

The linear sliding module 230 includes a sliding rail 231 and a sliding seat 232, wherein the sliding rail 231 is fixed to the lifting member 220, and the sliding seat 232 is slidably coupled to the sliding rail 231. In detail, the stationary member 210 is connected to the sliding seat 232, wherein the sliding seat 232 is fixed and does not move, and the sliding rail 231 may slide relative to the sliding seat 232. Moreover, the lifting member 220 or the display (not shown in the figures) is suitable for being pulled down by an applied force A toward a sliding direction SD, so as to descend from the first position shown in FIG. 1C to the second position shown in FIG. 1D or to an intermediate position between the first position shown in FIG. 1C and the second position shown in FIG. 1D, wherein an extending direction ED of the sliding rail 231 is parallel to the sliding direction SD and parallel to a gravity direction GD. For example, the number of the linear sliding module 230 may be one or a plurality, and may adopt a central configuration, a lateral configuration, a symmetrical configuration, or other suitable configurations.

In other examples, the stationary member 210 may be connected to the sliding rail 231, and the sliding seat 232 may be fixed to the lifting member 220. The sliding rail 231 is fixed and does not move, and the sliding seat 232 may slide relative to the sliding rail 231.

As shown in FIG. 1B to FIG. 1D, in the present embodiment, the lifting device 200 further includes a plurality of positioning bases 240, a plurality of reels 250, and a plurality of springs 260. Specifically, the plurality of positioning bases 240 are disposed on one of the stationary member 210 and the lifting member 220 and located between the lifting member 220 and the stationary member 210. In the present embodiment, the positioning bases 240 are provided on the stationary member 210. Each of the positioning bases 240 is provided with one reel 250, and the reel 250 is pivotally connected to the positioning base 240 and suitable for rotating relative to the positioning base 240. Moreover, the plurality of springs 260 are respectively wound around the plurality of reels 250 and connected to the other of the lifting member 220 and the stationary member 210 relative to the positioning bases 240. Based on the above, in the present embodiment, the positioning bases 240 are disposed at the stationary member 210, so the springs 260 are connected to the lifting member 220 relative to the positioning bases 240. As the lifting member 220 or the display (not shown in the figures) slides, the plurality of springs 260 driven by the lifting member 220 may respectively drive the plurality of reels 250 to rotate relative to the plurality of positioning bases 240 or respectively drive the plurality of reels 250 to rotate on the plurality of positioning bases 240.

As shown in FIG. 1C, the lifting member 220 is maintained at the first position, and the plurality of springs 260 are not stretched, or are in a state of a relatively smaller stretch amount. At this time, the lifting member 220 and the display (not shown in the figures) are maintained at the highest height position or a relatively high height position. As shown in FIG. 1D, the user may manually pull down the lifting member 220 or the display (not shown in the figures) to quickly adjust the height position of the display (not shown in the figures). For example, the lifting member 220 is lowered to the second position, so that the display (not shown in the figures) is lowered to the lowest height position or a relatively low height position. At this time, the plurality of springs 260 are stretched to continuously output elastic force, and form a pulling force F1 exerted on the lifting member 220.

Furthermore, the user only needs to manually push up or pull down the lifting member 220 or the display (not shown in the figures) to quickly adjust the height position of the display (not shown in the figures). For example, the display (not shown in the figures) is raised to the highest height position shown in FIG. 1C, the display (not shown in the figures) is lowered to the lowest height position shown in FIG. 1D, or the display (not shown in the figures) is raised and lowered between the highest height position shown in FIG. 1C and the lowest height position shown in FIG. 1D.

When the lifting member 220 and the display (not shown in the figures) move away from the first position shown in FIG. 1C toward the sliding direction SD, the plurality of springs 260 are stretched by the lifting member 220 to continuously output elastic force, and form the pulling force F1 exerted on the lifting member 220 to fix the height position of the display (not shown in the figures). Since the pulling force F1 is opposite to the gravity direction GD, the plurality of springs 260 may prevent the lifting member 220 and the display (not shown in the figures) from falling unexpectedly. Moreover, when the user manually pushes up the lifting member 220 or the display (not shown in the figures), the pulling force F1 exerted by the plurality of springs 260 on the lifting member 220 may assist the user to push up the lifting member 220 or the display (not shown in the figures) with less effort.

For example, when the display (not shown in the figures) is hung on the lifting member 220, under the weight of the display (not shown in the figures), the lifting member 220 may be slightly lowered from the first position shown in FIG. 1C to a third position located between the first position shown in FIG. 6C and the second position shown in FIG. 1D. The user may exert force to pull down the lifting member 220 or the display (not shown in the figures), so that the lifting member 220 and the display (not shown in the figures) slide toward the sliding direction SD from the third position to the fourth position, wherein the fourth position is higher than the second position shown in FIG. 1D and lower than the third position. After the lifting member 220 or the display (not shown in the figures) is no longer subjected to a force, the plurality of stretched springs 260 may exert the pulling force F1 on the lifting member 220 moving away from the third position, so that the lifting member 220 and the display (not shown in the figures) stay at the fourth position.

As shown in FIG. 1B to FIG. 1D, in the present embodiment, each of the springs 260 has a movable end 261 connected to the lifting member 220. In detail, the movable end 261 of each of the springs 260 moves as the lifting member 220 rises and falls to change the stretching length. For example, the movable end 261 of each of the springs 260 may be connected to the lifting member 220 through clamping, buckling, magnetic attraction, riveting, adhesion, welding, melting, or other suitable mounting methods.

For example, each of the springs 260 may be a constant force spring, and each of the springs 260 may be stretched by the lifting member 220 within a predetermined stroke range and generate a constant elastic force to exert a constant pulling force on the lifting member 220. In other examples, the springs 260 may be elastic elastomers.

For example, the elastic module may be formed by one positioning base 240, one reel 250, and one spring 260, and the number of the elastic module may be appropriately increased or decreased depending on the actual design or the weight of the display (not shown in the figures). The plurality of elastic modules may be arranged in one row, two rows up and down, or a plurality of rows up and down, and may be evenly distributed between the stationary member 210 and the lifting member 220.

Figure 1E:
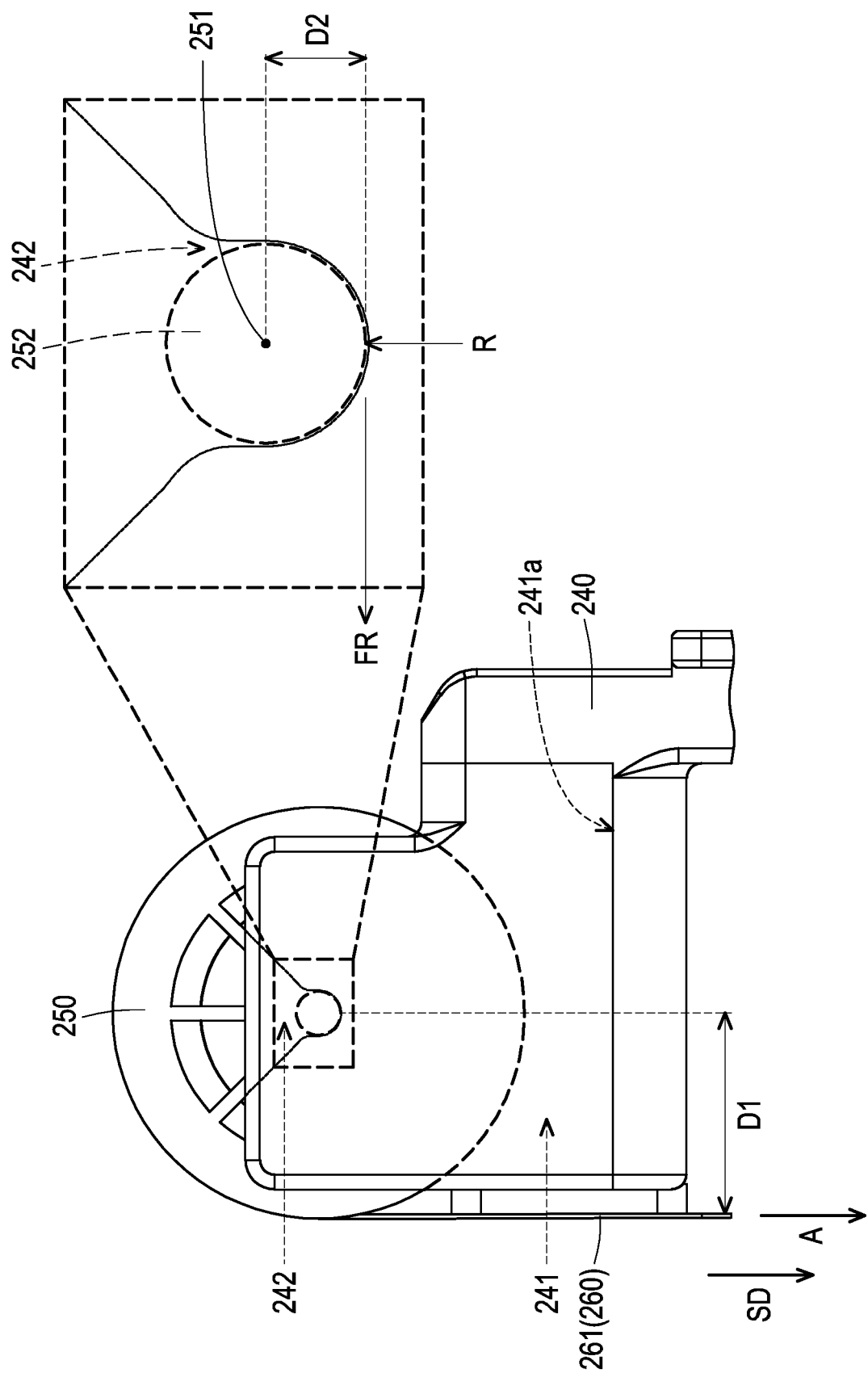
FIG. 1E is a schematic side view of a positioning base, a reel, and a spring disposed in a group in FIG. 1B.

FIG. 1E is a schematic side view of a positioning base, a reel, and a spring disposed in a group in FIG. 1B. Please refer to FIG. 1B to FIG. 1E. In the present embodiment, for each of the elastic modules, the positioning bases 240 may have a positioning groove 241 and a first pivot portion located in the positioning groove 241, wherein the reels 250 and the springs 260 wound thereon are accommodated in the positioning groove 241, and the reels 250 are rotatably coupled to the first pivot portion. Moreover, the reels 250 have an axis center 251 and a second pivot portion where the axis center 251 is located, and the second pivot portion is rotatably coupled to the first pivot portion.

In an example, the first pivot portion may be a pivot groove 242 formed on the sidewall surface of the positioning groove 241 and communicates with the positioning groove 241. Correspondingly, the second pivot portion may be a convex shaft 252 and is rotatably inserted into the pivot groove 242. In another example, the first pivot portion may be a convex shaft protruded beyond the sidewall surface of the positioning groove 241. Correspondingly, the second pivot portion may be a pivot groove for the convex shaft to be rotatably inserted therein.

In the following, the combination of the first pivot portion as the pivot groove 242 and the second pivot portion as the convex shaft 252 is used as an example. The design principle of the combination of the first pivot portion as the convex shaft and the second pivot portion as the pivot groove is the same or similar, and is therefore not repeated herein.

With the cooperation of the convex shaft 252 and the pivot groove 242, the reels 250 and the springs 260 wound thereon are suspended in the positioning groove 241, and there is a gap between the springs 260 and a bottom surface 241*a* of the positioning groove 241. Therefore, during the process of stretching or retracting the springs 260, the springs 260 do not contact the bottom surface 241*a* of the positioning groove 241 to reduce friction resistance. In other words, when the user pulls down or pushes up the lifting member 220 or the display (not shown in the figures), the springs 260 may smoothly drive the reels 250 to rotate relative to the positioning bases 240, thus not only helping to reduce the weight in the hand, but also helping to alleviate hand obstruction in operation.

As shown in FIG. 1E, in the present embodiment, for each elastic module, the axis center 251 of the reels 250 may be regarded as a fulcrum, wherein the movable end 261 of the springs 260 may be regarded as a force applying point, and the contact point of the outer peripheral surface of the convex shaft 252 and the inner wall surface of the pivot groove 242 may be regarded as a resistance point. In detail, there is a horizontal distance D1 between the movable end 261 of the springs 260 and the axis center 251 of the reels 250, which may be regarded as a first force arm or a force applying arm. Moreover, the outer peripheral surface of the convex shaft 252 rotatably contacts the inner wall surface of the pivot groove 242, wherein there is a vertical distance D2 (i.e., the radius of the convex shaft 252) between the axis center 251 of the reels 250 and the inner wall surface of the pivot groove 242, which may be regarded as a second force arm or a resistance arm.

As shown in FIG. 1E, the vertical distance D2 is less than the horizontal distance D1, that is, the second force arm is smaller than the first force arm, or the resistance arm is smaller than the force applying arm. As shown in FIG. 1C to FIG. 1E, taking the pull-down lifting member 220 or the display (not shown in the figures) as an example, the movable end 261 of the springs 260 is pulled down by the applied force A toward the sliding direction SD, and drives the reels 250 to rotate relative to the positioning bases 240. In addition, the rotation resistance generated when the reels 250 are rotated relative to the positioning bases 240 acts on the convex shaft 252. Specifically, the convex shaft 252 is rotated in the pivot groove 242 and generates a friction resistance FR opposite to the applied force A applied to the movable end 261.

Furthermore, the product of the applied force A and the horizontal distance D1 (i.e., the first force arm or force applying arm) is the applied torque. Correspondingly, the product of the friction resistance FR and the vertical distance D2 (i.e., the second force arm or resistance arm) is the resistance torque (or friction torque). Since the vertical distance D2 (i.e., the second force arm or the resistance arm) is less than the horizontal distance D1 or (i.e., the first force arm or the force applying arm), and the resistance torque (or friction torque) is smaller than the applying torque, the user may pull the lifting member 220 or display (not shown in the figures) more smoothly with less effort, that is, the springs 260 may smoothly drive the reels 250 to rotate relative to the positioning bases 240, thus not only helping to reduce the weight in the hand, but also helping to alleviate hand obstruction in operation.

In other words, by reducing the friction torque between the reels 250 and the positioning bases 240, when the user pulls down the lifting member 220 or display (not shown in the figures), the springs 260 may smoothly drive the reels 250 to rotate relative to the positioning bases 240, thus not only helping to reduce the weight in the hand, but also helping to alleviate hand obstruction during operation. In addition, bearings, such as ball bearings or needle bearings, may be optionally disposed between the lowering reels 250 and the positioning bases 240 to reduce friction.

As shown in FIG. 1E, the axis center 251 or the convex shaft 252 bears a resistance R (i.e., the positive force) opposite to the applied force A, and the product of the resistance R (i.e., the normal force) and the friction coefficient (i.e., the friction coefficient between the outer peripheral surface of the convex shaft 252 and the inner wall surface of the pivot groove 242) is equal to the friction resistance FR. Since the second force arm (or resistance arm) acted by the friction resistance FR is smaller than the first force arm (or force applying arm) acted by the applied force A, the reels 250 driven by the springs 260 may quickly overcome the friction resistance FR to rotate relative to the positioning bases 240.

Based on the above, the user only needs to manually push up or pull down the lifting member or the display to quickly adjust the height position of the display. Moreover, there are springs between the lifting member and the stationary member, wherein the springs continue to provide an upward pulling force during the lifting and lowering of the lifting member relative to the stationary member, and form a pulling force exerted on the lifting member to fix the height position of the display and prevent the lifting member and the display from falling accidentally. In addition, the pulling force exerted by the springs on the lifting member may assist the user to push up the lifting member or the display with less effort.

Furthermore, the positioning bases are fixed on the stationary member, and the reels are pivoted on the positioning bases. In addition, the springs are connected to the lifting member and wound around the reels. The convex shaft of the reels is pivotally connected to the positioning bases. There is a first force arm (or force applying arm) between the movable end of the springs and the axis center falling on the convex shaft, and the pull-down applied force acts on the first force arm. The radius of the convex shaft is the second force arm (or resistance arm), and the friction resistance acting on the convex shaft acts on the second force arm (or resistance arm). Since the second force arm (or resistance arm) is smaller than the first force arm (or force applying arm), and the resistance torque (or friction torque) is smaller than the application moment, the user may pull the lifting member or display more smoothly with less effort, that is, the springs may smoothly drive the reels to rotate relative to the positioning bases, thus not only helping to reduce the weight in the hand, but also helping to alleviate hand obstruction in operation.

Although the disclosure has been described with reference to the above embodiments, it will be apparent to one of the ordinary skill in the art that modifications and variations to the described embodiments may be made without departing from the spirit and scope of the disclosure. Accordingly, the scope of the disclosure will be defined by the attached claims not by the above detailed descriptions.

What is claimed is:

1. A lifting device, suitable for adjusting a height of a display, the lifting device comprising:
    a stationary member;
    a lifting member slidably coupled to the stationary member, and the lifting member is suitable for being fixed to a back portion of the display;
    a plurality of positioning bases disposed on one of the stationary member and the lifting member and located between the lifting member and the stationary member;
    a plurality of reels respectively pivoted on the positioning bases; and
    a plurality of springs respectively wound around the reels and connected to the other of the stationary member and the lifting member relative to the positioning bases, when the display or the lifting member is subjected to an applied force toward a sliding direction, the lifting member slides toward the sliding direction relative to the stationary member, and the springs stretched by the lifting member generate an elastic force, so that the lifting member and the display no longer subjected to a force stay at a height position after sliding.

2. The lifting device of claim 1, wherein the springs comprise a plurality of constant force springs.

3. The lifting device of claim 1, wherein each of the positioning bases has a positioning groove for accommodating the corresponding reel and the spring wound thereon, and a gap is kept between each of the springs and a bottom surface of the positioning groove where the spring is located.

4. The lifting device of claim 1, wherein each of the positioning bases has a first pivot portion, and each of the reels has an axis center and a second pivot portion where the axis center is located, and the second pivot portion of each of the reels is rotatably coupled to the first pivot portion.

5. The lifting device of claim 4, wherein each of the first pivot portions and the corresponding second pivot portion are a combination of a pivot groove and a convex shaft rotatably inserted in the pivot groove, each of the springs has a movable end connected to the lifting member, and there is a first force arm between the movable end of each of the springs and the corresponding axis center of the reel, an outer peripheral surface of each of the convex shafts is suitable for contacting an inner wall surface of the corresponding pivot groove, wherein a radius of each of the convex shafts forms a second force arm, and the second force arm is smaller than the first force arm.

6. The lifting device of claim 4, wherein each of the first pivot portions and the corresponding second pivot portion are a combination of a pivot groove and a convex shaft rotatably inserted in the pivot groove, each of the springs has a movable end connected to the lifting member, and there is a horizontal distance between the movable end of each of the springs and the corresponding axis center of the reel, an outer peripheral surface of each of the convex shafts is suitable for contacting an inner wall surface of the corresponding pivot groove, wherein there is a vertical distance between the axis center of each of the reels and the corresponding inner wall surface of the pivot groove, and the vertical distance is smaller than the horizontal distance.

7. The lifting device of claim 1, further comprising:
    at least one sliding rail fixed to the lifting member, wherein an extending direction of the at least one sliding rail is parallel to the sliding direction; and
    at least one sliding seat, wherein the stationary member is connected to the at least one sliding seat, and the at least one sliding seat is slidably coupled to the at least one sliding rail.

8. A lifting device, suitable for adjusting a height of a display, the lifting device comprising:
    a stationary member;
    a lifting member, wherein the lifting member is suitable for being fixed to a back portion of the display;
    a linear sliding module coupled between the stationary member and the lifting member, and the lifting member is slidably coupled to the stationary member through the linear sliding module to vertically slide relative to the stationary member between a first position and a second position lower than the first position;
    a plurality of positioning bases disposed on one of the stationary member and the lifting member and located between the lifting member and the stationary member;
    a plurality of reels respectively pivoted on the positioning bases; and
    a plurality of springs respectively wound around the reels and connected to the other of the stationary member and the lifting member relative to the positioning bases, when the display or the lifting member is subjected to an applied force toward a sliding direction, an axis center of each of the reels bears a resistance opposite to the applied force, the lifting member slides away from a third position through the linear sliding module, and the springs exert a pulling force on the lifting member moving away from the third position, so that the lifting member and the display stay at a fourth position after sliding after no longer subjected to a force, and the third position and the fourth position are between the first position and the second position.

9. The lifting device of claim 8, wherein the springs comprise a plurality of constant force springs.

10. The lifting device of claim 8, wherein each of the positioning bases has a positioning groove for accommodating the corresponding reel and the spring wound thereon, and a gap is kept between each of the springs and a bottom surface of the positioning groove where the spring is located.

11. The lifting device of claim 8, wherein each of the positioning bases has a first pivot portion, and each of the reels has an axis center and a second pivot portion where the axis center is located, and the second pivot portion of each of the reels is rotatably coupled to the first pivot portion.

12. The lifting device of claim 11, wherein each of the first pivot portions and the corresponding second pivot portion are a combination of a pivot groove and a convex shaft rotatably inserted in the pivot groove, each of the springs has a movable end connected to the lifting member, and there is a first force arm between the movable end of each of the springs and the corresponding axis center of the reel, an outer peripheral surface of each of the convex shafts is suitable for contacting an inner wall surface of the corresponding pivot groove, wherein a radius of each of the convex shafts forms a second force arm, and the second force arm is smaller than the first force arm.

13. The lifting device of claim 11, wherein each of the first pivot portions and the corresponding second pivot portion are a combination of a pivot groove and a convex shaft rotatably inserted in the pivot groove, each of the springs has a movable end connected to the lifting member, and there is a horizontal distance between the movable end of each of the springs and the corresponding axis center of the reel, an outer peripheral surface of each of the convex shafts is suitable for contacting an inner wall surface of the corresponding pivot groove, wherein there is a vertical distance between the axis center of each of the reels and the corresponding inner wall surface of the pivot groove, and the vertical distance is smaller than the horizontal distance.

14. The lifting device of claim 8, wherein the linear sliding module comprises at least one sliding rail and at least one sliding seat, and an extending direction of the at least one sliding rail is parallel to the sliding direction, and the at least one sliding rail is fixed to the lifting member, wherein the stationary member is connected to the at least one sliding seat, and the at least one sliding seat is slidingly coupled to the at least one sliding rail.

15. A lifting device, suitable for adjusting a height of a display, the lifting device comprising:
 a stationary member;
 a lifting member slidably coupled to the stationary member, and the lifting member is suitable for being fixed to a back portion of the display;
 a plurality of positioning bases disposed on one of the stationary member and the lifting member and located between the lifting member and the stationary member;
 a plurality of reels, wherein each of the reels has a pivot portion, and each of the reels is pivoted on the corresponding positioning base through a respective pivot portion thereof; and
 a plurality of springs respectively wound around the reels and connected to the other of the stationary member and the lifting member relative to the positioning bases, when the display or the lifting member receives an applied force toward a sliding direction, the springs are stretched, and the springs respectively drive the reels to rotate relative to the positioning bases, wherein the pivot portion of each of the reels bears a resistance opposite to the applied force, and a rotation resistance of each of the reels acts on the pivot portion.

* * * * *